Aug. 14, 1928.
F. W. SICKLES
INDUCTANCE
Filed April 15, 1926
1,680,955
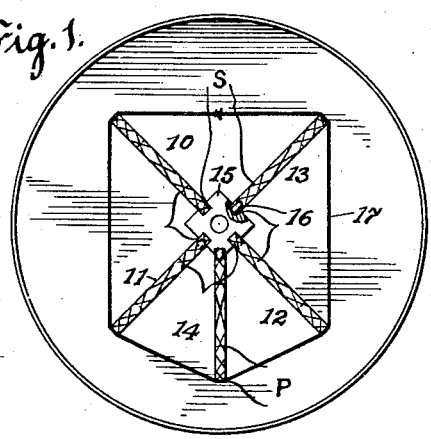
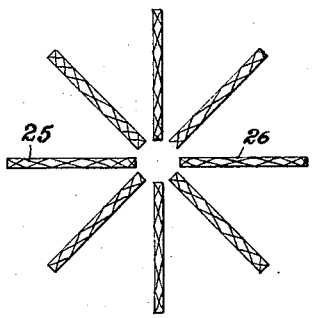
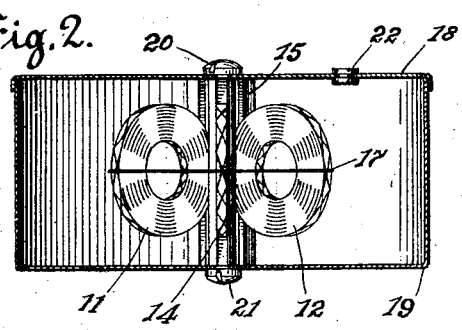
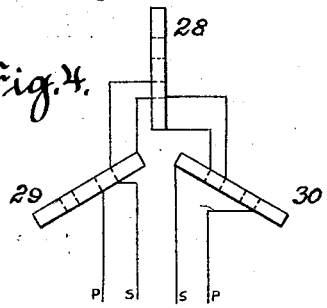
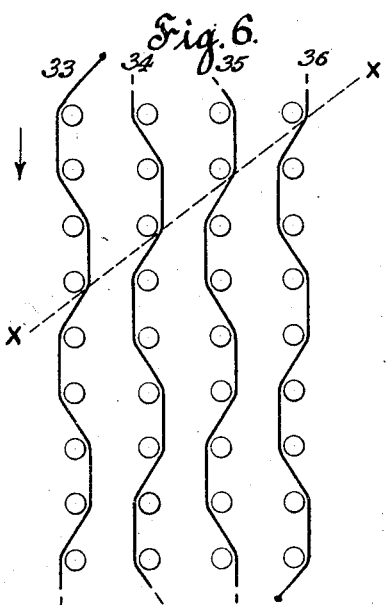
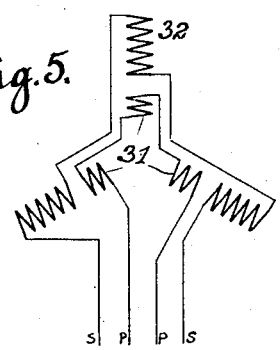
INVENTOR
Frank W. Sickles
BY
ATTORNEY Patented Aug. 14, 1928.

1,680,955

UNITED STATES PATENT OFFICE.

FRANK W. SICKLES, OF SPRINGFIELD, MASSACHUSETTS.

INDUCTANCE.

Application filed April 15, 1926. Serial No. 102,343.

This invention relates particularly to apparatus for electric signalling purposes such as radio frequency amplifier coils.

One object is to provide a compact device of high efficiency. It is also sought to produce a device having practically no stray or external field which would affect adjacent instruments or circuits. Another object is to provide a set of coils which can be used with high efficiency over a wide range of frequencies. Specifically it is desired to avoid such losses as are due to eddy currents and/or capacities.

Briefly but broadly stated the invention contemplates the assembly of a plurality of relatively thin coils around an axis in such a way that the fields of the successive coils unite to form a self contained cylindrical field. By using fine wire the coils can be made very small. The set of coils is preferably enclosed in a copper case.

Figs. 1 and 2 are plan and side views respectively, partly in section showing one form of the invention.

Fig. 3 is a plan view of a modification.

Fig. 4 is a plan view of another form.

Fig. 5 is a circuit diagram of one form such as Fig. 4.

Fig. 6 shows diagrammatically the relative arrangement of turns in the preferred winding.

In the form shown in Figs. 1 and 2 five coils 10, 11, 12, 13 and 14 are arranged around the support 15. The support may be of insulating material slotted to receive the edges of the coils which may be held in place by cement of any suitable kind or by pins 16 which extend into the coils. The coils may be tied together by string or tape around the inside or around the outside as at 17 which latter arrangement gives greater stability.

In this form of construction, if the coils 10, 11, 12 and 13 are all connected in series, it will be understood that the magnetic field of each coil will be drawn inwardly by the adjacent coils so that very little will escape beyond the outer edges of the coils which constitute the secondary S.

The primary winding P in this form includes all of the coil 14. The wide spaces between the coils keep the capacity losses very low. This arrangement furnishes much lower high frequency resistance than a corresponding toroid.

The closely confined cylindrical field makes this type peculiarly well fitted for enclosure in a metallic shield for instance of copper with only insignificant eddy losses. Such a shielding box may be made of a cover 18 and detachable body 19 held together by the screws 20 and 21 which screw into the post 15. The taps or leads may be brought out through bushings or eyelets such as 22. There is very little capacity loss between the coils and the box wall on account of the very thin edges which are presented toward the box.

Fig. 3 shows a transformer with eight small coils. One or more of the coils 25 and 26 or parts of one or more may constitute the primary windings and the remainder, the secondary.

Fig. 4 shows three coils 28, 29 and 30, each having a part of the primary winding P and part of the secondary winding S. The primary sections may be wound at the centers of the coils or in sections intermediate the inner and outer layers of the coils and preferably midway between the outer and inner layers of the secondary.

Fig. 5 shows diagrammatically the arrangement of the windings of three coils with a primary section 31 in the center of each coil and the secondary section 32 at the outer edge of the coil.

The individual coils are preferably quite thin and may be made of fine wire such as #32 gage so as to furnish the necessary characteristics in a very small space. No iron core is ordinarily desired in the individual coils or in the group.

Fig. 6 shows diagrammatically the preferred method of winding the coils zig zag, back and forth, on an uneven number of pins, viz: in the direction of the arrow around two, through the coil wall, around two, through etc. By this arrangement each turn is wound on the previous turn but set back one pin at each turn along the line X—X so that only every fourth layer or turn corresponds. 33 represents the first layer or turn, 34 the next succeeding layer or turn, then 35, then 36. The next layer or turn would correspond with 33 etc. This particular method of winding produces a very compact, stable coil of very high efficiency peculiarly adapted to the radial disposition which is characteristic of this invention although I consider that many of the advantages of the invention may be obtained with other thin coils.

I claim:

1. An inductance comprising the combination of a series of thin cellular spirally wound coils arranged radially around a common axis with inter-connecting fields some part of one or more of such coils being the primary winding and the remainder the secondary winding.

2. An inductance comprising a series of at least three thin cellular spirally wound coils arranged about a common axis, at least three of such coils having secondary windings and at least one of such coils having a primary winding whereby a substantially enclosed compound field is produced.

3. A device as set forth in claim 2, enclosed in a copper case and having small capacity between the edges of the coils and the case.

4. A device as set forth in claim 1, having low capacity between the adjacent coils and a low high frequency resistance in the coils.

5. A device as set forth in claim 1 in which the individual coils consist of superposed sets of 4 turns wound zig-zag.

6. A device as set forth in claim 2, in which the individual coils consist of superposed sets of 4 turns wound zig-zag.

7. A slotted insulating post, a series of thin coils secured in the slots in said post and disposed radially around said post.

8. A slotted insulating post, a series of thin coils secured in the slots in said post and disposed radially around said post, and a tie surrounding the outer edges of the coils to hold them in place.

9. A device as set forth in claim 2 in which the individual coils consist of superposed sets of turns wound zig-zag and a metallic case enclosing said device and having small capacity between the edges of the coils and the case.

10. A transformer comprising an insulating post having radially disposed insulating pins projecting therefrom and a thin cellular coil supported on each pin, said pin projecting radially into the edge of said coil.

11. A transformer comprising an insulating post having a series of radially disposed pins projecting therefrom and a thin cellular coil supported by wires on each pin, said pin extending radially into said coil and a tie connecting the outer edges of the various coils.

FRANK W. SICKLES.